US00RE34276E

United States Patent [19]

Glaser et al.

[11] E Patent Number: Re. 34,276

[45] Reissued Date of Patent: Jun. 8, 1993

[54] TURBOCHARGER BEARING AND LUBRICATION SYSTEM

[75] Inventors: Jerry Glaser, Playa Del Rey; David G. Elpern, Los Angeles, both of Calif.

[73] Assignee: Allied-Signal Inc., Morristown, N.J.

[21] Appl. No.: 637,239

[22] Filed: Jan. 3, 1991

Related U.S. Patent Documents

Reissue of:

[64] Patent No.: 4,798,523
Issued: Jan. 17, 1989
Appl. No.: 944,498
Filed: Dec. 19, 1986

[51] Int. Cl.[5] ..... F04B 17/00; F04B 35/04

[52] U.S. Cl. ..... 417/407; 384/504; 384/518

[58] Field of Search ..... 417/405, 406, 407; 384/501, 504, 505, 517, 518, 535

[56] References Cited

U.S. PATENT DOCUMENTS

| | | | |
|---|---|---|---|
| Re. 15,233 | 11/1921 | Sellew | 384/504 |
| 1,495,564 | 5/1924 | Vincon | 384/504 |
| 1,965,293 | 7/1934 | Ljungstrom | 384/535 |
| 2,173,489 | 9/1939 | Voight | 417/407 |
| 2,775,400 | 12/1956 | Cox | 417/407 X |
| 3,017,230 | 1/1962 | Meermans | 417/407 |
| 3,640,593 | 2/1972 | McKee et al. | 384/504 |
| 3,651,550 | 3/1972 | Bennett | 384/501 X |
| 3,692,146 | 9/1972 | Butler | 184/6.4 X |
| 3,827,236 | 8/1974 | Rust | 60/605 B X |
| 3,986,754 | 10/1976 | Torrant | 384/504 |
| 4,122,673 | 10/1978 | Leins | 417/407 |
| 4,285,632 | 8/1981 | DeSalve | 184/6.11 X |
| 4,426,965 | 1/1984 | Patel | 123/196 R X |
| 4,625,219 | 3/1987 | McEachern, Jr. | 417/407 |

FOREIGN PATENT DOCUMENTS

| | | | |
|---|---|---|---|
| 740905 | 11/1955 | United Kingdom | 417/407 |

OTHER PUBLICATIONS

MacInnes, H. *Turbochargers*, HP Books, Tucson, Ariz. 85703, 1984, p. 74.

*Primary Examiner*—Leonard E. Smith
*Attorney, Agent, or Firm*—Ken C. Decker; William N. Antonis

[57] ABSTRACT

The rotating components of an exhaust gas driven turbocharger are supported by a pair of axially separated ball bearings having an outer race and an inner race. A spacer between the bearings engages the outer race of both bearings and exerts a preload bias on the outer races of the bearings urging the outer races away from one another. Accordingly the bearings are preloaded so that centrifugal forces generated during high speed operation will not force the ball bearing away from the inner races.

28 Claims, 3 Drawing Sheets

FIG. 1
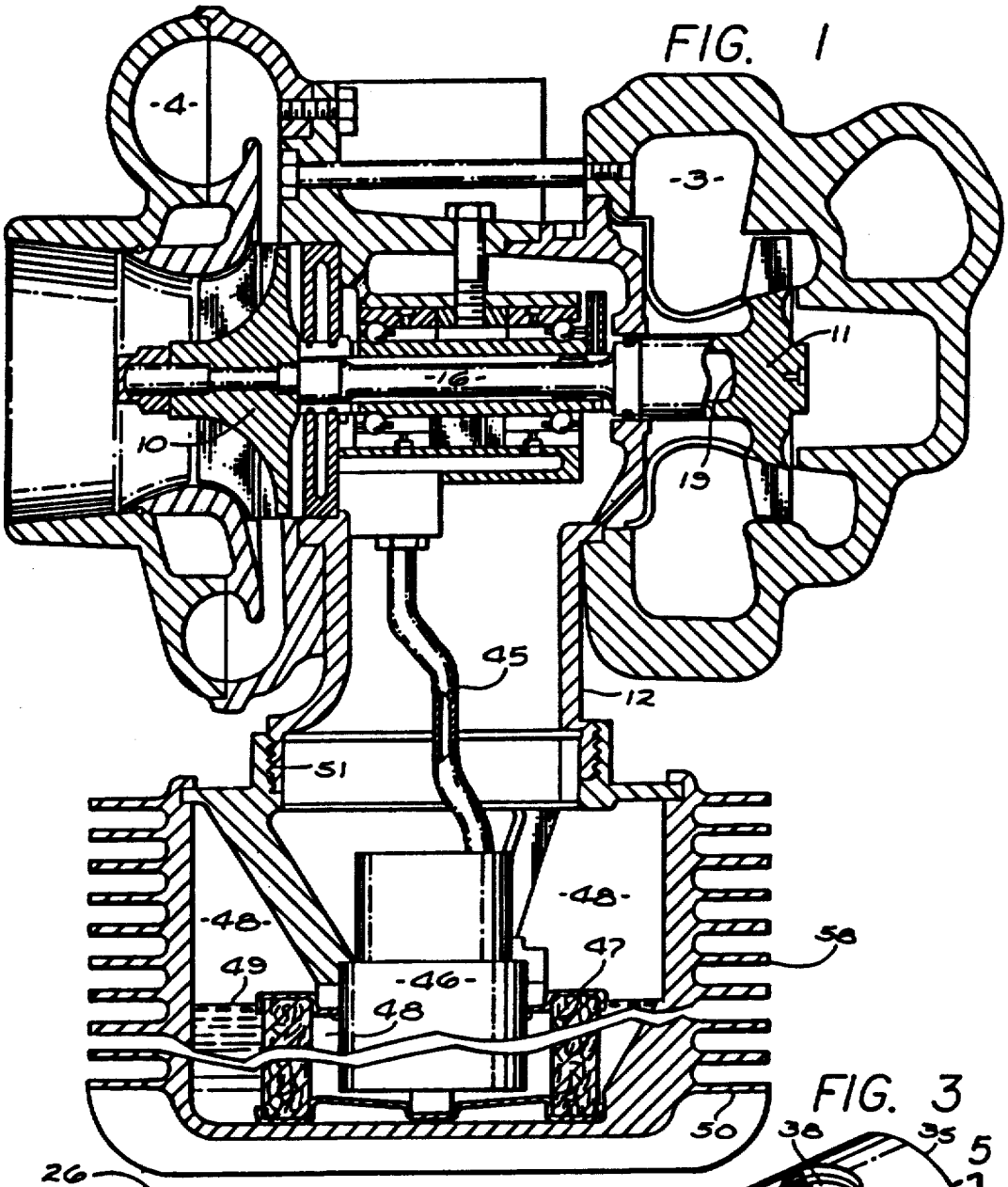
FIG. 3
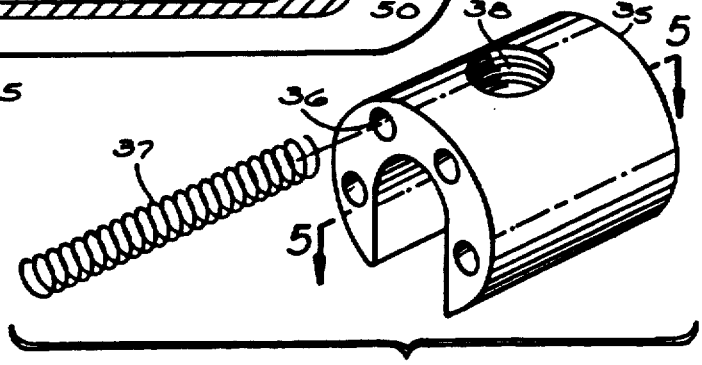
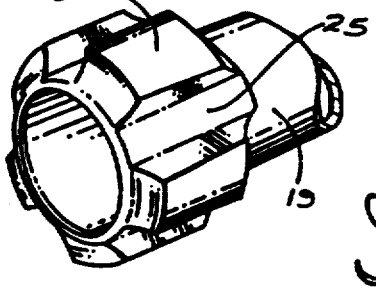
FIG. 4

TURBOCHARGER BEARING AND LUBRICATION SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to turbochargers, systems and methods, and particularly to ball bearings used within turbochargers. The standard turbocharger arrangement consists basically of an exhaust gas driven turbine wheel on a common shaft with a compressor wheel. The manner in which the shaft is supported is critically important. A properly constructed bearing supports the shaft in such a manner as to minimize rotational friction. Other characteristics of the bearing scheme include isolation of the gases in contact with the turbine and compressor wheels, minimization of heat transfer from the hot turbine gases and provision of adequate lubrication to combat wear.

SUMMARY OF THE INVENTION

The turbocharger of the present invention employs a ball bearing to rotationally support the shaft and reduce friction. The high rotational speed of turbochargers have heretofore tended to prohibit the use of ball bearings in the design. This is because of the extreme centrifugal fores of the orbiting balls can exert more pressure on the outer ball bearing race than the inner ball bearing race exerts on the orbiting balls. In this case, the balls will separate from contact with the inner race, allowing the shaft to wobble. At the high rotational speeds of turbochargers, mainly on the order of from 100,000–125,000 RPM, this problem is severe. The manner in which the outer races are preloaded substantially eliminates this problem in the present invention.

Another major problem involving the turbochargers is the cost and difficulty of manufacture. In building a turbocharger, a number of parts must be cast, machined and then assembled. The time and effort required to assemble the critical bearings support parts during overall turbocharger construction, in good working order, is especially great. This relationship also exists for other part groupings, such as the lubrication parts group. The ability to assemble parts into cartridge-type assemblies prior to ultimate construction of the turbocharger will save time and labor costs.

Another problem is overheating of turbocharger internals from frictionally produced as well as exhaust heat. The present invention employs an air slinger to produce a cooling air flow along the shaft, countercurrent to the heat source.

Another problem encountered in turbocharger design involves the lubrication system. Turbochargers often use the same lubrication system of the engines which they serve. Engine lubricant systems usually allow abrasive matter in the lubricant which, given the close tolerancing of turbochargers, will lead to undue scoring and wear of the bearing surfaces. Normally a separate lubrication supply system requires a mechanical connection to the engine which the turbocharger serves. The separate lubrication system of the present invention is a compact, self-continaed, electrically driven cartridge type which can, in the event of failure, be easily replaced.

BRIEF DESCRIPTION OF THE DRAWINGS

Further objects and advantages of the invention will become apparent from the following description and claims, and from the accompanying drawings wherein:

FIG. 1 is a cross-sectional view of a turbocharger showing the present invention;

FIG. 3 is an isometric view of the horseshoe shaped spacer assembly of the ball bearing cartridge of FIG. 2;

FIG. 4 is an enlarged isometric view of a portion of the turbocharger shaft of FIGS. 1 and 2;

DESCRIPTION OF THE PREFERRED EMBODIMENT

Figure 2:
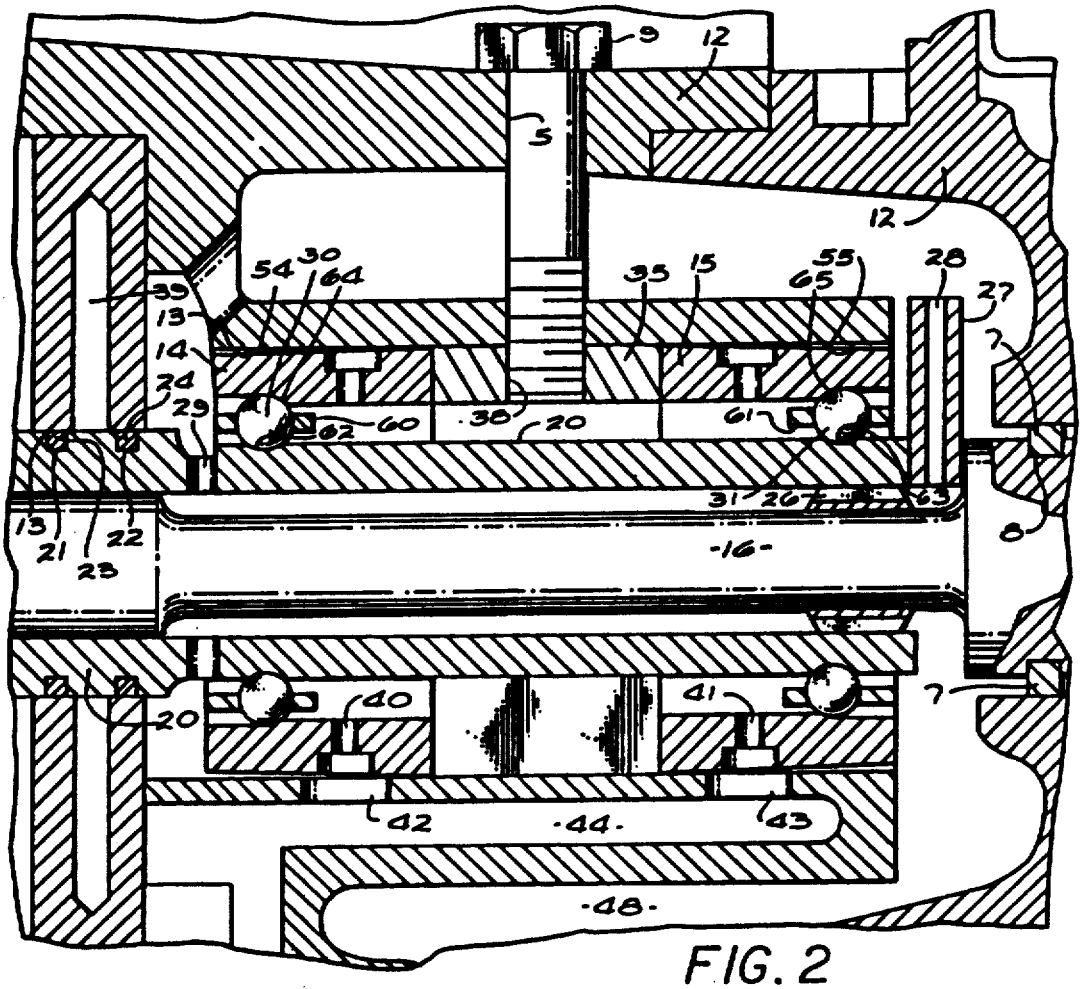
FIG. 2 is an enlarged cross-sectional view of a portion of the turbocharger of FIG. 1 showing the improved ball bearing cartridge of the present invention.

Referring to FIG. 1, the turbocharger has a turbine wheel 11 and a compressor wheel 10 which are joined by shaft 16. A portion of shaft 16 nearest turbine blade assembly 11 contains void 19 which reduces the area available for thermal conduction from turbine blade assembly 11 through shaft 16.

Now, referring to FIG. 2 for an enlarged view of the details of the bearing assembly, shaft 16 has a shaft piston ring slot 8 near turbine wheel 11. The turbocharger body 12 surrounds this portion of shaft 16, and shaft piston ring 7 is fitted in frictional contact with body 12 such that shaft piston ring 7 fits closely within shaft piston ring slot 8 on shaft 16. The resulting assembly will aid in the prevention of the hot exhaust gases, which drive turbine wheel 11, from entering the area near the turbocharger bearing area, and thus enhance thermal isolation of the hot side of the turbocharger.

Referring to FIG. 4 as well as FIG. 2, the turbine end of shaft 16 is fitted with a series of air passage fins 26 about the periphery of shaft 16, thereby forming air passage slots 25. Air passage fins 26 are equally spaced around shaft 6, and engage inner race 20 on its inner surface as shown in FIG. 2. Immediately adjacent air passage fins 26, inner race 20 is equipped with air slinger 27 having an air slinger bore 28. The turning of shaft 16, inner race 20, and air slinger 27 create a centrifugal force on the air within air slinger bore 28, causing it to pass out of air slinger bore 28 and creating an air flow along the outer surface of shaft 16 in the annular space between shaft 16 and the inner surface of inner race 20. Air enters this passage through air inlet passage 29 near the compressor end of the turbocharger. The air flow produces a countercurrent cooling effect on inner race 20, to compress the temperature gradient created in inner race 20 by virtue of its contact with the hot exhaust gases driving turbine wheel 11.

Figure 5:
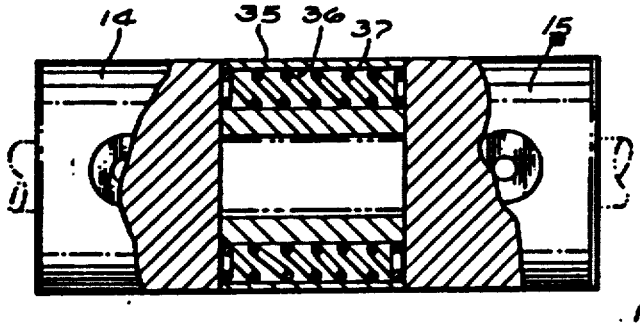
FIG. 5 is a top sectional view partially cut away of the ball bearing cartridge of FIG. 2.

Referring to FIGS. 2 and 5, the inner race 20 supports the ball bearings generally designated as 30 for the compressor side of the turbocharger and 31 for the turbine side of the turbocharger. The ball bearings 30 and 31 ar e located within inner race groove 62 and inner race groove 63 respectively. Ball bearings 30 and 31 are separated peripherally about inner race 20 by ball bearing separators 60 and 61 respectively.

Figure 6:
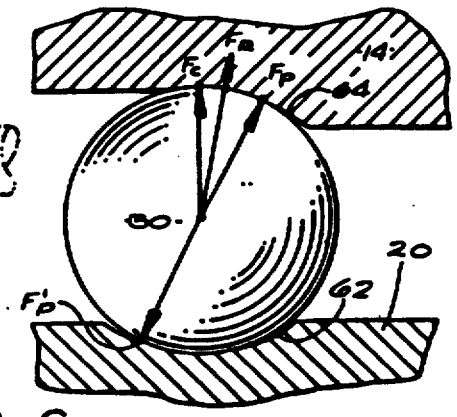
FIG. 6 is an enlarged cross-section of the end of the outer races of the ball bearing cartridge of FIG. 2, illustrating the centrifugal, preload, and resultant forces acting upon the ball bearing.

FIG. 6, which shows an enlarged view of compressor side outer race 14, the turbine side of inner race 20, and ball bearing 30, illustrates the forces at work under preloading. Compressor side outer race 14 has a shoulder 64, on its inner surface, to engage ball bearings 30, and outer race 15 has a shoulder 65, on its inner surface, to engage ball bearings 31. Under a preloaded, (non-operated) condition, compressor side outer race 14 is urged to the left, parallel to and relative to inner race 20. The inward sloping outer race shoulder 64 of outer race 14 engages ball bearings 30 against inner race goove 62 of inner race 20. Compressor side outer race 14 and inner race 20 are then connected by forces in ball bearings 30 which exist from a point labeled $F_P$ on compressor side outer race 14 to a point also labeled $F_P$ shown on inner race 20. Absent preloading, the centrifugal orbit of bal bearing 30 against compressor side outer race 14 would produce a centrifugal force when running labeled $F_C$. The $F_C$ force, which is perpendicular to the axis of the shaft, would tend to press the inner surface of the outer race centrifugally outward. If any two races and ball bearings were designed without preloading, and even if the tolerances between the ball bearings and both of the other surfaces were set to zero, the centrifugal forces of the ball bearings 30 would push the compressor side outer race 14 radially outward, thus creating a gap between ball bearings 30 and inner race 20. Such a gap would allow the shaft to "wobble" and nutate at high speeds. In the case of a turbocharger where extremely high speeds are the norm, the destruction of the turbocharger would occur. Under conditions of preloading, ball bearings 30 at rest exhibits force $F_P$ against compressor side outer rae 14. As the bearings begin to turn, the ball bearings 30 attempt to exert an increasing centrifugal force against the internal surface of compressor side outer race 14 represented by FC. The combination of these two forces results in a resultant force $F_R$ shown on FIG. 6 as being angularly between $F_P$ and $F_C$. As the speed increases, FC becomes larger with respect to $F_P$, and the resultant force $F_R$ shifts counterclockwise between $F_P$ and $F_C$. The leftward force on compressor side outer race 14 must always be great enough that the resultant force $F_R$ will never be close enough to $F_C$ to allow ball bearings 30 to break contact with inner race 20, or the compressor side outer race 14. In this manner, regardless of the wear on inner race 20, compressor side outer race 14, or ball bearings 30, the shaft is always kept in perfect alignment. Similarly, regardless of wear on the turbine side of inner race 20, turbine side outer race 15 or ball bearings 31, the shaft is always kept in perfect alignment.

To urge compressor side outer race 14 and turbine side outer race 15 away from each other, horseshoe spacer assembly 35 fits therebetween. Referring to FIG. 3, the horseshoe spacer assembly 35 is provided with preload spring pockets 36 containing preload springs 37 which act to force compressor side outer race 14 and turbine side outer race 15 axially away from each other. The length of horseshoe spacer assembly 35 is important because once fitted in place between compressor side outer race 14 and turbine side outer race 15, the total clearance between horseshoe spacer assembly 35 and both the compressor side outer race 14 and the turbine side outer race 15 will determine the amount of axial float allowed for the shaft 16. This clearance is chosen such that regardless of how much the outer races 14 and 15 shift axially, the multiple coil springs 37 are always enabled to exert the aforementioned sufficient amount of force on the compressor side outer race 14 and turbine side outer race 15 in order to keep the ball bearings 30 and 31 in full contact with inner race 20. The horseshoe spacer assembly 35 is held in place within body 12 by locating pin 9 which is fit through aperture 5 of body 12. Horseshoe spacer assembly 35 is equipped with a threaded bore 38 into which the locating pin threads 6 of locating pin 9 screwedly fit.

Referring again to FIG. 2, the compressor side of inner race 20 is equipped with slots 21 and 22. Piston ring 23 and piston ring 24 frictionally fit within the inner surface of body bore 13, and are adapted to fit within piston ring slot 21 and piston ring slot 22 respectively to aid in isolating the inside of the turbocharger of the present invention from the compressed fluid with which compressor wheel 10 is exposed. Oil drainage vent 39 is provided within body 12 between piston ring 23 and piston ring 24 in order to allow the escape of any of the compressor side fluid, if the fluid is able to creep past piston ring 23, before it is able to creep past piston ring 24.

The external surfaces of outer races 14 and 15 may be beveled to a slight frusto conical shape (FIG. 2), the frusto conical section at its smaller diameter further away from horseshoe shaped spacer 35, or they may be cylindrical. The slight frusto conical taper creates annular space 54 between the external surface of outer race 14 and the internal surface of body bore 13. Annular space 55 is created between the external surface of outer race 15 and the internal surface of body bore 13. This space, when occupied with a fluid of sufficient viscosity, preferably lubricating oil, creates a squeeze film damper which resists radial displacement of the bearing assembly within body bore 13. Since energy is required to "squeeze" the liquid film from one side of its annular space to the other, any exerted energy of the rotating shaft, which tends to angularly displace the axis of shaft 16 and its associated bearing parts, will be damped by the energy requirement of the shifting fluid of the squeeze film damper.

Compressor side outer race 14 contains outer race oil inlet aperture 40 and turbine side outer race 15 contains oil inlet aperture 41. Oil inlet aperture 40 is in fluid communication with body oil inlet aperture 42 and oil inlet aperture 41 is in fluid communication with body oil inlet aperture 43. Both body oil inlet apertures 42 and 43 are connected to oil supply channel 44. Oil supply channel 44 is connected tool supply channel 45 (also shown on FIG. 1).

Referring to FIG. 1, oil for lubrication and cooling is electrically pumped through oil supply channel 45, and then through oil supply channel 44, to be supplied through body oil inlet apertures 42 and 43, and oil inlet apertures 40 and 41, and then to flow into the annular space between inner race 20 and compressor side outer race 14 and turbine side outer race 15, to lubricate same. At its destination, the oil lubricates ball bearings 30 and 31, absorbs heat from inner race 20, and exits to drain area 48 from various points within the bearing structure.

Figure 7:
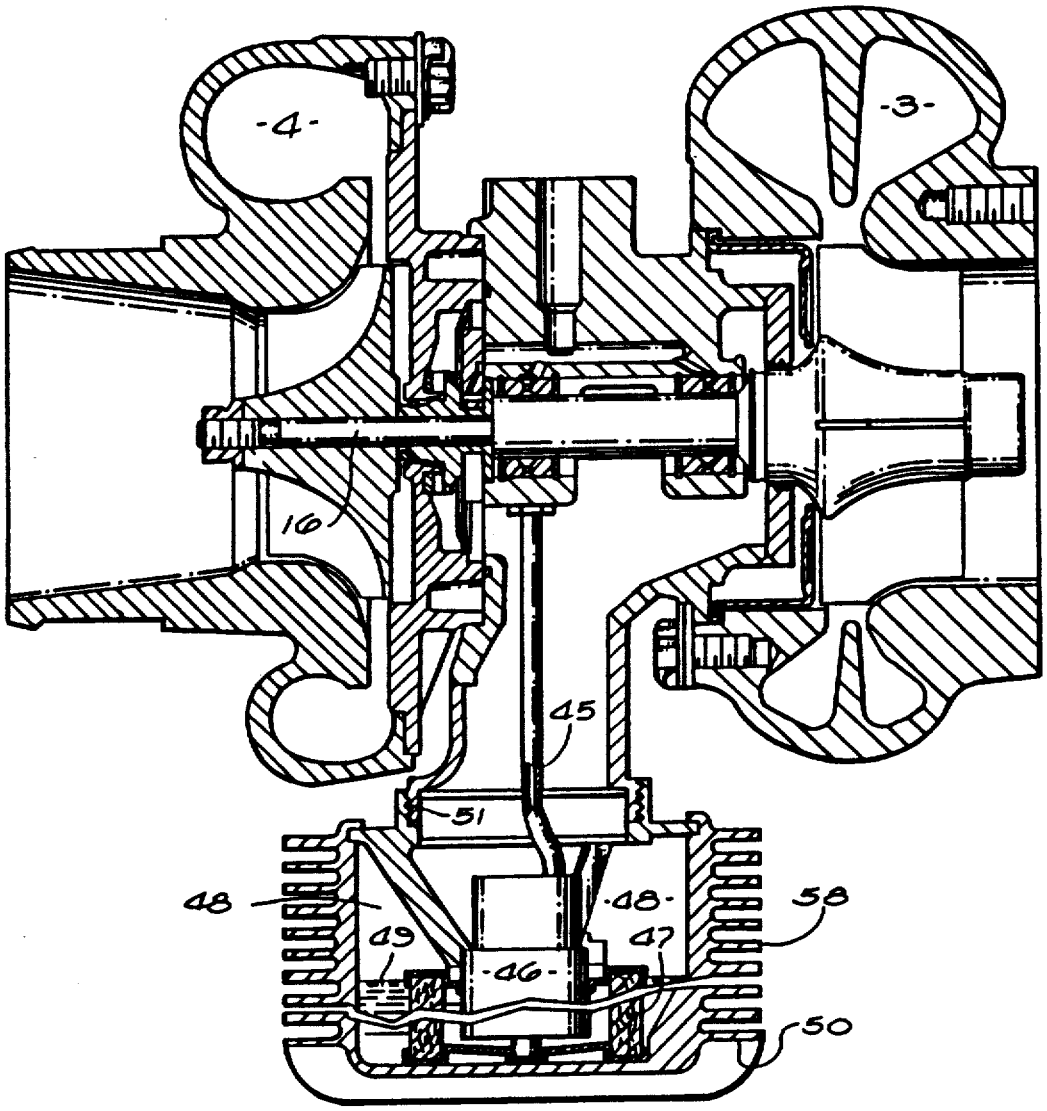
FIG. 7 is a cross section of a turbocharger illustrating the cartridge-lubrication system of the present invention.

The lubricant supply system is also illustrated in FIG. 1. Surrounded by body 12, oil supply channel 45 continues into a cylindrically shaped oil filter 47. Oil filter 47 is situated concentrically within oil cartridge 50 at the bottom of oil cartridge 50. Oil cartridge 50 is connected to body 12 by means of oil cartridge threads 51. The oil level shown at 49 is higher outside the periphery of filter 47 than inside the periphery of filter 47. Oil returning from lubrication and cooling surface within the turbocharger arrives outside of filter 47 and due to the higher oil level 49 outside of filter 47 then within it, the oil sets up a gravity-inducted height gradient within the walls of the filter 47 to provide the force for the transport of the oil through filter 47. Electrically driven pump 46, located concentrically within filter 47, pumps the filtered oil through oil supply channel 45 and back to the internals of the turbocharger for lubrication and temperature reduction service. The pump 46 is powered by any electrical source, which is usually the engine starting battery. While being filtered, the oil contained within oil cartridge 50 is cooled by heat conduction through the surface of oil cartridge 50, including ribs 58. FIG. 7 illustrates the cartridge-type lubrication system attached to a conventional exhaust driven turbocharger not having a ball bearing cartridge.

In the operation of the turbocharger of the present invention, hot exhaust gases are introduced into turbine housing 3 which drive turbine wheel 11. The action of preload springs 37 on compressor side outer race 14 and turbine side outer race 15 maintains full contact of the outer races 14 and 15 on ball bearings 30 and 31 and therefore full contact of ball bearings 30 and 31 on the inner race 20. This condition will hold, even when the diameter of the ball bearings 31 and 32 are reduced by wear. While the turbocharger is operating, the action of the dampening effect of squeezable clearance 54 and squeezable clearance 55 act to maintain the shaft 16 in alignment as the turbine wheel 11 is driven by the hot gases. Shaft 16 then turns compressor wheel 10 within compressor housing 4 to compress any fluid.

During operation, electrically driven pump 46 pumps oil, which has been filtered by filter 47, through oil supply channel 45, oil supply channel 44, body oil inlet apertures 42 and 43, oil inlet apertures 40 and 41, into the annular space between the turbine and compressor side outer races 14 and 15 respectively, and inner race 20 for the lubrication of ball bearings 30 and 31 or in the case of FIG. 7, to the conventional floating sleeve bearing.

While specific embodiments of this turbocharger with cartridge bearing assembly and cartridge lubrication system have been disclosed in the foregoing description, it is intended that many modifications and adaptations should and are intended to be comprehended within the meaning and range of this invention, without any such modifications and adaptations causing a departure from the spirit and scope of the invention.

Having described the invention with sufficient clarity that those skilled in the art may make and use it, we claim:

1. A turbocharger comprising:

a turbine, having a turbine wheel within a turbine housing;

a compressor, having a compressor wheel within a compressor housing;

a shaft extending between said turbine wheel and said compressor wheel;

a center housing disposed between said turbine housing and said compressor housing and disposed around said shaft and including bearing means, supported by a bearing bore, to rotatably support said shaft;

lubrication means, separate from said internal combustion engine lubrication system, to lubricate said bearing means, and air ventilation means comprising an inner race, surrounding said shaft, an air slinger, mounted on said inner race, freely rotatable within said main housing and a multiplicity of ribs, mounted in the annular space between said shaft and said inner race, and parallel to the axis of said shaft, to allow air flow longitudinally along said shaft in the annular space between the outer surface of said shaft and the inner surface of said inner race, said inner race having one or more apertures near the end of said shaft opposite said air slinger, to permit entry of air into the annular space between said shaft and said inner race, to facilitate air flow for cooling said shaft.

2. A turbocharger comprising:

a turbine, having a turbine wheel within a turbine housing;

a compressor, having a compressor wheel within a compressor housing;

a shaft extending between said turbine wheel and said compressor wheel;

a center housing disposed between said turbine housing and said compressor housing and disposed around said shaft and including bearing means, supported by a bearing bore, to rotatably support said shaft; and lubrication means, separate from said internal combustion engine lubrication system, to lubricate said bearing means, said bearing means further comprising an inner race rotatable with said shaft, more than one outer race supported by said center housing, and a multiplicity of ball bearings disposed between said inner and said outer races to allow said inner race to rotate with respect to said outer race, each of said outer races having an external surface whose general cylindrical shape is reduced to a slight frustoconical shape to the degree necessary to form a squeeze film damper against said bearing bore, into which it is to be placed, the angle of said frustoconical approach and the space between said slight frustoconical outer periphery of said outer race and the inner periphery of said bearing bore to be dictated by the physical properties of the material to be used interstitially to form said squeeze film damper.

3. A turbocharger comprising:

a turbine, having a turbine wheel within a turbine housing;

a compressor, having a compressor wheel within a compressor housing;

a shaft extending between said turbine wheel and said compressor wheel;

a center housing disposed between said turbine housing and said compressor housing and disposed around said shaft and including bearing means, supported by a bearing bore, to rotatably support said shaft; and lubrication means, separate from said internal combustion engine lubrication system, to lubricate said bearing means, said lubrication means further comprising a lubrication cartridge housing, a filter assembly, mounted concentrically within said lubrication cartridge housing, for filtering lubrication fluid, and an electrically driven pump mounted within said filter assembly for pumping filter lubricant to said turbocharger.

4. An improved turboncharger comprising:

a turbine, having a turbine wheel;

a compressor, having a compressor wheel;

a shaft having two ends, one end connected to said turbine wheel and the other end connected to said compressor wheel;

cartridge bearing means, for rotatably supporting said shaft; and a housing, disposed between said turbine and compressor, and supporting said cartridge bearing means, said cartridge bearing means further comprising a tubular inner ball bearing race, having a internal diameter suitable for fitting around the outside diameter of said turbocharger shaft to be supported, said inner race also having a pair of outwardly disposed grooves, located on its outside circumference, axially near said ends of said inner race, a multiplicity of ball bearings situated circumferentially around the outer diameter of said inner race and within the said grooves of said inner race, a ball bearing separator fittable circumferentially outward of the external diameter of said inner race, said ball bearing separator having a series of circular slots about the midpoint of its axial length, said slots sized for receiving said ball bearings and separating said ball bearings in their orbit around the inner race, a pair of outer races annularly cylindrically shaped, each having an axially linear outside surface, and having an internal shoulder such that the greater diameter of the internal surface is nearer the end outwardly disposed with respect to the ball bearing cartridge assembly, said shoulder to allow said outer race to be slipped directly over said ball bearings located within said grooves of said inner race and continue until said shoulder within the internal diameter of said inner wall of said outer race contacts and bears against said ball bearing, further urging said ball bearing against said groove of said inner race, a spacer and preload assembly, generally of annular piston-like shape, having a parallel-sided opening along its length greater than the diameter of said inner race, circumferentially around which said spacer assembly will lie, said spacer assembly further having a series of longitudinal bores, the axis of said bores parallel to the axis of said spacer assembly, and said bores radially spaced about the axis of said spacer assembly for axially separating and urging apart said outer races, and a multiplicity of preload springs, each locatable within each of said bore within said spacer assembly, said preload springs for urging contact with the inwardly disposed faces of said outer races, for springly urging said outer races away from each other and away from said spacer assembly, in order to maintain the force applied to said ball bearings by the bearing pressure of said inner and outer races against said ball bearing.

5. The turbocharger as recited in claim 4 further comprising:

air ventilation means along the surface of said shaft, to allow air flow for cooling said shaft.

6. The turbocharger of claim 5, wherein said air ventilation means further comprises:

an inner race, surrounding said shaft;

an air slinger, mounted on said inner race, freely rotatable within said main housing; and a multiplicity of ribs, mounted in the annular space between said shaft and said inner race, and parallel to the axis of said shaft, to allow air flow longitudinally along said shaft in the annular space between the outer surface of said shaft and the inner surface of said inner race, said inner race having one or more apertures near the end of said shaft opposite said air slinger, to permit entry of air into the annular space between said shaft and said inner race, to facilitate air flow for cooling said shaft.

7. The turbocharger of claim 6, further comprising:

a squeeze film damper between the outer periphery of said outer races, and the inner periphery of said bearing bore within said main housing, to adsorb energy and thus dampen any tendency of said bearing assembly and said shaft towards axial angular displacement.

8. An improved ball bearing cartridge comprising:

a turbular inner ball bearing race, having an internal diameter suitable for fitting around the outside diameter of any shaft desired to be supported, said inner race also having a pair of grooves, located on its outside diameter, axially near the ends of said inner race;

a set of ball bearings situated circumferentially around the outer diameter of said inner race and within the said grooves of said inner race;

a ball bearing separator fittable circumferentially outward of the external diameter of said inner race, said ball bearing separator having a series of circular slots about the midpoint of its length, said slots seized for receiving said ball bearings and separating said ball bearings in their orbit around the inner race;

a pair of outer races annularly cylindrically shaped, having an axially linear outside surface, fittable with a bearing bore, and having an internal surface which is grooved concentrically outwardly towards the end outwardly disposed with respect to the bearing cartridge assembly, said groove to allow said outer race to be slipped directly over said ball bearings, and continue until the groove within the internal diameter of said inner wall of said outer race bears against said ball bearing, further urging said ball bearing against said groove of said inner race;

a spacer and preload assembly, of generally annular piston like shape, having a parallel sided opening along its length greater than the diameter of the inner race, circumferentially around which said spacer assembly will lie, said spacer assembly further having a series of longitudinal bores, the axis of said bores parallel to the axis of said spacer assembly, and said bores evenly radially spaced about the axis of said spacer assembly for axially separating said outer races; and a multiplicity of preload springs, each locatable within said bore within said spacer assembly, said preload springs for urging contact with the inwardly disposed faces of said outer races, for springingly urging said outer races away from each other and away from said spacer assembly, in order to maintain the force applied to said ball bearings by the bearing pressure of said inner and outer races against said ball bearings.

9. The improved ball bearing cartridge assembly of claim 8 wherein:

each of said outer races have an external surface whose generally cylindrical shape is reduced to a slight frusto-conical shape to the degree necessary to form a squeeze film damper against said bearing bore, into which it is to be placed, the angle of said frusto-conical approach and the space between said slight frusto-conical outer periphery of said outer race and the inner periphery of said bearing bore into which it is to be placed, to be dictated by the physical properties of the material to be used interstitially to form said squeeze film damper.

10. The improved ball bearing cartridge of claim 8 further comprising:

an air slinger on said inner race, in order to produce an air flow in the annular space between said shaft and said inner race, axially along said shaft.

11. The improved ball baring cartridge assembly of claim 10 wherein:

each of said outer races having an external surface whose general cylindrical shape is reduced to a slight frusto-conical shape to the degree necessary to form a squeeze film damper against said bearing bore, into which it is to be placed, the angle of said frusto-conical approach and the space between said slight frusto-conical outer periphery of said outer race and the inner periphery of said bearing bore to be dictated by the physical properties of the material to be used interstitially to form said squeeze film damper.

12. An improved, exhaust gas driven turbocharger comprising:

a shaft;

a tubular inner ball bearing race, having an internal diameter suitable for fitting around the outside diameter of said shaft, said inner race also having a pair of outwardly disposed grooves, located on its outside circumference, each axially near said ends of said inner race;

a set of ball bearing situated circumferentially around the outer diameter of said inner race and within each of said grooves of said inner race;

a plurality of ball bearing separators fittable circumferentially outward of the external diameter of and axially near said ends of said inner race, said ball bearing separators having a series of circular slots about the midpoints of their axial length, said slots sized for receiving said bal bearings and separating said ball bearings in their respective orbits around the inner race;

a plurality of outer races annularly cylindrically shaped, each having an axially linear outside surface, and having an internal shoulder, and oriented such that the greater diameter of the internal surface is nearer the end outwardly disposed with respect to the ball bearing cartridge assembly, said shoulder to allow said outer races to be slipped directly over said ball bearings, each located within said grooves axially near said ends of said inner race, and continue until said shoulders within the internal diameters of said inner walls of said outer races contact and bear against said ball bearings, further urging said ball bearings against said grooves of said inner race;

a spacer and preload assembly, generally of annular piston-like shape, having a parallel sided opening along its length greater than the diameter of said inner race, circumferentially around which said spacer assembly will lie, said spacer assembly further having a series of longitudinal bores, the axis of said bores parallel to the axis of said spacer assembly, and said bores radially spaced about the axis of said spacer assembly for axially separating and urging apart said outer races;

a multiplicity of preload springs, each locatable within each of said bores within said spacer assembly, said preload springs for uring contact with the inwardly disposed faces of said outer races, for springingly urging said outer races away from each other and away from said spacer assembly, in order to maintain the force applied to said ball bearings by the bearing pressure of said inner and outer races against said ball bearing;

a main housing defining a bearing bore for receiving said outer race;

a turbine wheel mounted on one end of said shaft within said turbine housing;

a compressor wheel mounted on the other end of said shaft, both said turbine wheel and said compressor wheel rotatable with said shaft;

a lubrication cartridge housing, attached to said main housing, the outside surface of said lubrication cartridge housing defining a series of raised ribs to enhance heat dissipation;

a filter assembly, mounted concentrically within said lubrication cartridge housing to filter said lubrication fluid; and an electrically driven fluid pump mounted concentrically within said filter assembly for pumping the filtered lubricant back through said main housing to lubricate said bearing means.

13. The improved exhaust gas driven turbocharger of claim 12 further comprising:

an air slinger, mounted on said inner race, freely rotatable within said main housing; and a multiplicity of ribs, mounted in the annular space between said shaft and said inner race, and parallel to the axis of said shaft, to allow air flow longitudinally along said shaft in the annular space between the outer surface of said shaft and the inner surface of said inner race, said inner race having one or more apertures near the end of said shaft opposite said air slinger, to permit entry of air into the annular space between said shaft and said inner race, to facilitate air flow for cooling said shaft.

14. The improved exhaust gas driven turbocharger of claim 13, further comprising:

a squeeze film damper between the outer periphery of said outer races, and the inner periphery of said bearing bore within said main housing, to absorb energy and thus dampen any tendency of said bearing assembly and said shaft towards axial angular displacement.

15. The method of assembling a ball bearing cartridge, comprising the steps of:

sliding a first outer race of a ball bearing assembly ferentially around one end and axially towards the center of an inner race, said inner race having a suitably sized internal diameter for fittably surrounding a shaft;

sliding a ball bearing separator, having apertures, over the end of said one and of said inner race;

placing a first set of ball bearings within said apertures of said ball bearing separator and against an outwardly disposed groove of said inner race;

sliding said first outer race axially towards said one end of said inner race onto which said ball bearings were placed, and axially away from the center of said inner race until said first outer race makes forceable contact between its inner surface and said first set of ball bearings;

sliding the second outer race of a ball bearing assembly circumferentially around the other end and axially towards the center of said inner race;

sliding a ball bearing separator, having apertures, over said other end of said inner race;

placing a second set of ball bearings within said apertures of said ball bearing separator against an outwardly disposed groove of said inner race;

sliding said second outer race axially towards said other end of said inner race and axially away from the center of said inner race until said second outer race makes forceable contact between its inner surface and said second set of ball bearings; and inserting a horseshoe shaped axially springingly urging spacer between said first outer race and said second outer race, to springingly urge said first outer race away from said second outer race, and away from said spacer, and urge said first and second outer races into constant contact with and under constant bearing force against said first and second set of ball bearings, respectively.

16. The method of claim 15 further comprising the steps of:

disposing an air slinger on said inner race, in order to produce an air flow in the annular space between said inner race and said shaft, axially along said shaft.

17. The method of constructing an improved turbocharger, comprising the steps of:

forming the first half and second half of said main housing;

forming a bore in said first half of said housing;

forming a ball bearing cartridge assembly by:

sliding the first outer race of a ball bearing assembly circumferentially around one end and axially towards the center of an inner race;

sliding a first ball bearing separator, having apertures, over said one end of said inner race;

placing a first set of ball bearings within said apertures of said first ball bearing separator and against an outwardly disposed groove of said inner race;

sliding said first outer race axially towards said one end of said inner race and axially away from the center of said inner race until said first outer race makes forceable contact between its inner surface and said first set of ball bearings;

sliding the second outer race of a ball bearing assembly circumferentially around the other end and axially towards the center of an inner race;

sliding a second ball bearing separator, having apertures, over said other end of said inner race;

placing a second set of ball bearings within said apertures of said second ball bearing separator against an outwardly disposed groove of said inner race;

sliding said second outer race axially towards said other end of said inner race and axially away from the center of said inner race until said second outer race makes forceable contact between its inner surface and said second set of ball bearings;

inserting a horseshoe shaped springingly axially urging spacer between said first outer race and said second outer race, to springingly urge said first outer race away from said second outer race, and away from said spacer, and to thereby urge said first and said second outer race into constant contact with and under constant bearing force against said first and said second ball bearing set, to complete formation of said ball bearing assembly;

fitting said ball bearing cartridge assembly, so formed, circumferentially outwardly of and around a shaft, such that the outer periphery of said shaft is fixably fittably in contact with said inner periphery of said inner race, for the purpose of rotatable support of said shaft by said ball bearing cartridge;

afixing a turbine blade assembly to one end of said shaft;

afixing a compressor blade assembly to the other end of said shaft;

fitting said ball bearing cartridge, which supports said shaft, said turbine blade assembly and said compressor blade assembly, into said bore within said first half of said housing;

placing said second half of said formed housing into mating alignment with said first half of said housing, to form the completed turbocharger assembly.

18. The method of claim 17 further comprising the steps of:

attaching a separate lubrication housing to said turbocharger housing;

providing communication between said separate lubrication housing and said ball bearings; and pumping lubricant from said housing to said ball bearings during turbocharger operation and for a short time after the turbocharger stops operating.

19. The method of claim 17 further comprising the steps of:

attaching an oil filter and pump assembly to said two completed halves of said housing to lubricate said ball bearing cartridge, and filter said lubrication fluid, and to assist in dissipating heat buildup in said lubricating fluid.

20. The method of claim 19 further comprising the step of:

disposing an air slinger on said inner race after said affixing a compressor blade step, in order to produce an air flow in the annular space between said shaft and said interval, axially along said shaft, said shaft having a multiplicity of longitudinal ribs for fittable engagement with the internal surface of said inner race to facilitate said air flow in said annular space.

21. An improved turbocharger comprising:

a turbine, having a turbine wheel;

a compressor, having a compressor wheel;

a shaft having two ends, one end connected to said turbine wheel and the other end connected to said compressor wheel;

cartridge bearing means, for rotatably supporting said shaft;

a housing, disposed between said turbine nd compressor, and supporting said cartridge bearing means, said cartridge bearing including a pair of bearings spaced axially along said shaft for rotatably supporting the latter, each of said bearings having an outer race, an axially extending spacer between said bearings, and preload bias generating means carried by said spacer and engaging the outer race of each of said bearings for simultaneously urging the outer race of each of said bearing away from one another and urging the outer face of each of said bearings away from said spacer.

22. The turbocharger as claimed in claim 24, wherein said spacer includes circumferentially spaced pockets extending through said spacer substantially parallel to said shaft, said bias generating means including spring means located in said pockets and compressed between the outer races of said bearings.

23. The turbocharger as claimed in claim 24, wherein said spacer includes a pocket extending through the spacer substantially parallel to said shaft, said bias generating means including resilient means supported in said pocket and compressed between the outer races of said bearing.

24. The turbocharger as claimed in claim 23, wherein said resilient means is a coiled spring supported in said pocket.

25. The turbocharger of claim 24, wherein said preload bias generating means includes at least one spring carried by said spacer.

26. The turbocharger of claim 25, wherein said spring extends through said spacer and is compressed between the outer races of said bearings.

27. The turbocharger as claimed in claim 26, wherein said spacer includes at least one pocket extending through said space substantially parallel to said shaft, said spring being a coiled spring supported by said spacer in said pocket, said coiled spring having a pair of opposite ends for transmitting the force generated by compression of the spring in said pocket to said outer races.

*28. A turbocharger comprising a housing, a cartridge bearing assembly for rotatably supporting a shaft within said housing for rotation relative to said housing, said shaft having a pair of ends, a turbine wheel mounted on one end of the shaft for rotation therewith, and a compressor wheel mounted on the other end of the shaft for rotation therewith, said cartridge assembly comprising a first set of ball bearing elements spaced circumferentially around said shaft, a second set of ball bearing elements spaced circumferentially around said shaft and spaced axially from said first set of ball bearing elements with respect to said shaft, a substantially cylindrical inner race common to both said first set and said second set of ball bearing elements for supporting said ball bearing elements in cooperation with a substantially cylindrical outer race, each of said races circumscribing said shaft, said inner race being rotatable with said shaft, each of said races including portions extending between said first and second sets of ball bearing elements, at least one portion of said inner race being supported directly upon said shaft and another portion of said inner race being separated radially from said shaft to define an air gap therebetween.*

* * * * *